United States Patent
Corradi et al.

(10) Patent No.: US 12,522,417 B2
(45) Date of Patent: Jan. 13, 2026

(54) BAG, METHOD, AND MACHINE FOR PRODUCING A FOAM-IN-BAG DUNNAGE MATERIAL

(71) Applicant: Storopack Hans Reichenecker GMBH, Metzingen (DE)

(72) Inventors: Marco Corradi, Reggio Nell'Emilia (IT); Dante Olmi, Sassuolo (IT); Eugenio Pepe, Reggio Nell'Emilia (IT); Fabio Montermini, Modena (IT)

(73) Assignee: Storopack Hans Reichenecker GmbH, Metzingen (DE)

( * ) Notice: Subject to any disclaimer, the term of this patent is extended or adjusted under 35 U.S.C. 154(b) by 70 days.

(21) Appl. No.: 17/998,392

(22) PCT Filed: May 28, 2021

(86) PCT No.: PCT/EP2021/064373
§ 371 (c)(1),
(2) Date: Nov. 10, 2022

(87) PCT Pub. No.: WO2021/239959
PCT Pub. Date: Dec. 2, 2021

(65) Prior Publication Data
US 2023/0227233 A1    Jul. 20, 2023

(30) Foreign Application Priority Data
May 29, 2020    (EP) .................................. 20177515

(51) Int. Cl.
*B65D 81/107*    (2006.01)
*B01F 23/235*    (2022.01)
(Continued)

(52) U.S. Cl.
CPC ........ *B65D 81/1075* (2013.01); *B01F 23/235* (2022.01); *B01F 31/55* (2022.01);
(Continued)

(58) Field of Classification Search
CPC ............ B65D 81/3272; B65D 81/1075; B31D 5/0078; B29C 44/182; B01D 23/235; B01D 31/55
(Continued)

(56) References Cited

U.S. PATENT DOCUMENTS 2,899,318 A    8/1959    Long
3,419,134 A  *  12/1968   Fitts ..................... B65D 81/051
                                                53/472
(Continued)

FOREIGN PATENT DOCUMENTS

BE        1004585 A6    12/1992
DE       19814469 A1    10/1999
(Continued)

OTHER PUBLICATIONS

PCT/EP2021/064373 filed May 28, 2021; International Search Report.
(Continued)

*Primary Examiner* — Chun Hoi Cheung
(74) *Attorney, Agent, or Firm* — Wood Herron & Evans LLP

(57) ABSTRACT

A bag for producing a foam-in-bag dunnage material comprises a closed edge portion and, in a non-sealed state of the bag, an open edge portion, the closed and open edge portions delimiting an inner bag volume. The invention proposes that a bag structure of the bag comprises a mixing chamber which is adapted to receive foam precursor substances, which is arranged within the inner bag volume, which is at least partially and initially delimited against the remainder of the inner bag volume, and which in the non-sealed state of the bag is connected to the open edge portion.

10 Claims, 5 Drawing Sheets

(51) Int. Cl.

| | |
|---|---|
| *B01F 31/55* | (2022.01) |
| *B29B 7/56* | (2006.01) |
| *B29B 7/74* | (2006.01) |
| *B29C 44/18* | (2006.01) |
| *B29K 105/04* | (2006.01) |
| *B29L 31/00* | (2006.01) |
| *B31D 5/00* | (2017.01) |
| *B65D 81/32* | (2006.01) |

(52) U.S. Cl.
CPC .............. *B29B 7/56* (2013.01); *B29B 7/7428* (2013.01); *B29C 44/182* (2013.01); *B31D 5/0078* (2013.01); *B65D 81/3272* (2013.01); *B29K 2105/04* (2013.01); *B29L 2031/7138* (2013.01)

(58) Field of Classification Search
USPC .................................................. 206/219–222
See application file for complete search history.

(56) References Cited

U.S. PATENT DOCUMENTS

| | | | | |
|---|---|---|---|---|
| 4,557,377 | A * | 12/1985 | Maloney | B65D 31/12 |
| | | | | 383/44 |
| 4,952,068 | A * | 8/1990 | Flint | B01F 25/42 |
| | | | | 366/162.3 |
| 5,699,902 | A * | 12/1997 | Sperry | B29C 44/183 |
| | | | | 206/219 |
| 5,727,370 | A | 3/1998 | Sperry | |
| 5,996,781 | A | 12/1999 | Glaser et al. | |
| 6,499,600 | B2 * | 12/2002 | Koyanagi | B65D 33/01 |
| | | | | 206/524.8 |
| 6,997,319 | B2 * | 2/2006 | Mahon | B29C 44/184 |
| | | | | 428/35.2 |
| 8,757,405 | B2 * | 6/2014 | Snyder | A61J 9/001 |
| | | | | 215/11.4 |
| 8,967,374 | B2 * | 3/2015 | Py | A61J 7/0053 |
| | | | | 206/568 |
| 9,567,147 | B2 * | 2/2017 | Park | B65D 81/3266 |
| 2002/0092272 | A1 * | 7/2002 | Sperry | B31D 5/0078 |
| | | | | 53/562 |
| 2002/0092279 | A1 * | 7/2002 | Sperry | B29C 65/7433 |
| | | | | 53/374.4 |
| 2011/0100844 | A1 * | 5/2011 | Cimaglio | C04B 40/065 |
| | | | | 206/219 |

FOREIGN PATENT DOCUMENTS

| | | |
|---|---|---|
| DE | 19814469 C2 | 7/2000 |
| DE | 102014009990 A1 | 1/2016 |
| EP | 2480393 B1 | 11/2018 |

OTHER PUBLICATIONS

PCT/EP2021/064373 filed May 28, 2021; Written Opinion.
EP 20177515.2 Search Report dated Oct. 23, 2020.
EP 20177515.2 Office Action dated Jan. 31, 2025.

* cited by examiner

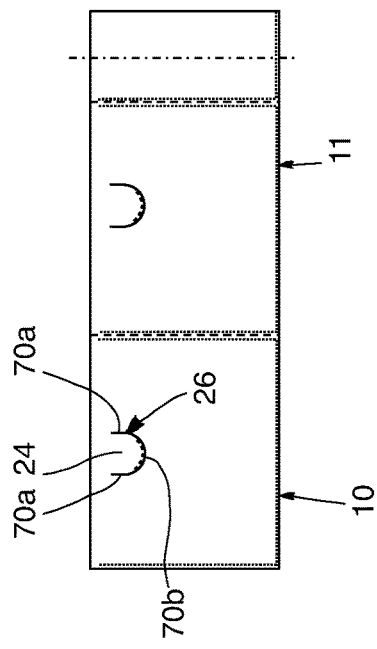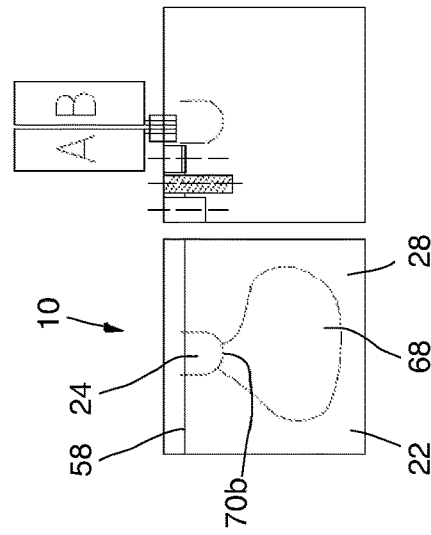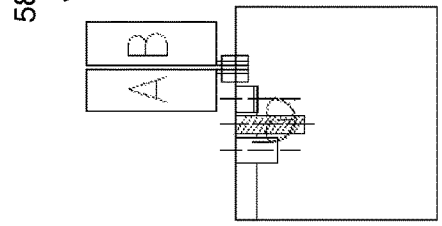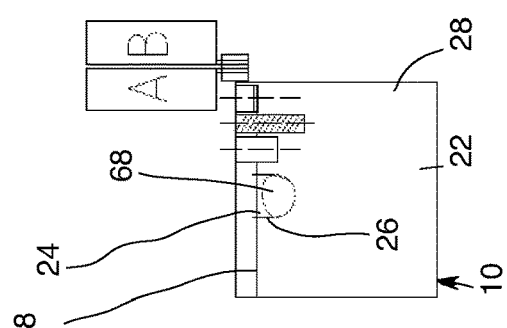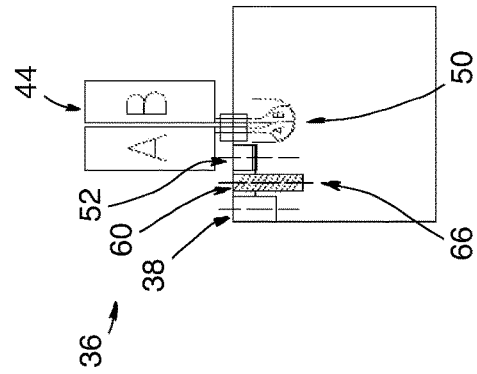
FIG. 9
FIG. 14
FIG. 13
FIG. 12
FIG. 11
FIG. 10

BAG, METHOD, AND MACHINE FOR PRODUCING A FOAM-IN-BAG DUNNAGE MATERIAL

This Application is a U.S. National Phase Application of PCT/EP2021/064373 filed May 28, 2021, which claims the priority benefit of European Patent Application No. 20 177 515.2 filed on May 29, 2020, both of which are hereby incorporated by reference herein as if fully set forth in their entirety.

The present invention relates to a bag, a method, and a machine for producing a foam-in-bag dunnage material according to the preambles of the independent claims.

Foam-in-bag dunnage material is known as a technology where a plurality of liquid chemical foam precursor substances is injected into a plastic bag. The liquid chemical foam precursor substances react with each other by expanding and building a rather low density foam which, after expansion, hardens. This hardened foam may fill a void volume in a container between the container walls and an article placed inside the container, thus blocking the articles inside the container from moving around and also providing a protecting function against shocks movements.

EP 2 480 393 B1 discloses a machine for producing a foam-in-bag dunnage material. The machine has a complicated structure comprising a base and a shell which are movable relative each other. A plastic bag may be held and pressed between the base and the shell by means of pressing surfaces which comprise opposing recesses forming a mixing chamber for the foam precursor substances.

It is an object of the present invention to provide a bag, a method, and a machine for producing a foam-in-bag dunnage material which are simply to apply and allow to save cost.

According to the invention this object is solved by a bag, a method, and a machine for producing a foam-in-bag dunnage material with the features of the independent claims. Further embodiments of the invention are given in the dependent claims.

A major advantage of the invention is that the mixing chamber is formed by the bag structure of the bag itself used for producing the foam-in-bag dunnage material and not by an external structure, for example the machine using such a bag. By consequence, the machine maybe very simple and does not need to have the movable base and shell of the prior art. Forming the mixing chamber by the bag structure is easily to achieve for example by regionally connecting adjacent side walls of the bag with each other during production of the bags.

More specifically, the invention proposes a bag for producing a foam-in-bag dunnage material. The bag maybe produced from a plastic material, more preferably from a thin plastic film. The plastic film comprising the prefabricated and preconfigured bags maybe rolled up on a cylindrical roll forming a supply for a web type bag supply material in a machine for producing the foam-in-bag dunnage material.

The inventive bag comprises a closed edge portion and, in a non-sealed state of the bag, an open edge portion. By way of example, initially the bag may, without any foam or foam precursor substances fed therein, have a generally rectangular flat shape, wherein one closed edge portion is formed by a fold and two opposing closed edge portions are formed by welding opposed side walls together. Thus, the closed and open edge portions delimit an inner bag volume which, in a state of the bag where no foam or foam precursor substances are inside the bag, normally is almost zero.

According to the invention a bag structure of the bag comprises a mixing chamber which is adapted to receive liquid chemical foam precursor substances to be mixed with each other when being contained within the mixing chamber. The mixing chamber is arranged within the inner bag volume, is at least partially and initially delimited against the remainder of the inner bag volume, and in the non-sealed state of the bag is connected to the open edge portion. This means that the mixing chamber defines a special volume within the inner bag volume which at least initially is more or less separate from the remainder of the inner bag volume.

Furthermore, in the non sealed state of the bag the mixing chamber is connected with the open edge portion which allows to introduce the liquid chemical foam precursor substances through the open edge portion into the mixing chamber. Thereafter the open edge portion is closed which transforms the bag from its non sealed state into a sealed state wherein the inner bag volume and the mixing chamber are sealed against an outside of the bag, and the liquid chemical foam precursor substances may start to chemically react with each other.

This chemical reaction is enhanced by providing a mixing action to the liquid chemical foam precursor substances enclosed within the mixing chamber which mixing action may thoroughly mix the liquid chemical foam precursor substances and create a mixture of these substances within the mixing chamber, while this mixture essentially is held in place within the mixing chamber since the mixing chamber is at least partially and initially delimited against the remainder of the inner bag volume.

In order to provide the mixing action, a machine for producing a foam-in-bag dunnage material uses a bag as described above and comprises a mechanical mixing device which is adapted to provide a mixing action onto an exterior surface of the bag in the region of the mixing chamber. However, alternatively or additionally it is also possible to provide the mixing action by manually acting onto an exterior surface of the bag, for example by means of the hands of a person.

The chemical reaction of the liquid chemical foam precursor substances makes the mixture to expand by building gas bubbles inside the still liquid substances. Since the mixing chamber is only at least partially and initially delimited against the remainder of the inner bag volume, the mixture is allowed to expand from the mixing chamber into the remainder of the inner bag volume. By consequence, the expanding mixture flows from the mixing chamber into the remainder of the inner bag volume and begins more or less to fill out the remainder of the inner bag volume.

Preferably, the bag in its sealed state and with the still liquid mixture of foam precursor substances is inserted for example into a container immediately after termination of the mixing action and well before the foam precursor substances have fully expanded from the mixing chamber into the remainder of the inner bag volume. By doing so, the expanding mixture may expand into and thus at least partially fill out the void volume inside the container which is formed between the container walls and one or more articles placed inside the container. At the end of the expansion process, the expanded mixture will harden and form together with the bag (forming an enclosure for the expanding mixture and thus preventing the expanding mixture from contacting the article(s) inside the container) a piece of low density foam dunnage material which snugly fits to the shape of the void volume.

The inventive machine for producing a foam-in-bag dunnage material comprises a feed device for feeding a bag, as described above, towards an injection device. The feed device may comprise an electrical drive and, for example, opposing and driven rotating wheels or rollers between which the bag is compressively held. The injection device is adapted to inject liquid chemical foam precursor substances into the bag and may comprise, for example, a plurality of nozzles which may be introduced into the mixing chamber during injection and removed from the mixing chamber thereafter.

The mixing device of the inventive machine is adapted to provide a mixing action onto an exterior surface of the mixing chamber of a bag after injection. The injection device can be arranged during injection in an injection section of the machine, and the mixing device can be arranged during the mixing action in a mixing section of the machine. The mixing section is arranged, seen in a feed direction of the bag film material, downstream from the injection section, and the feed device is adapted to move the bag such that a mixing chamber of the bag, after injection, moves from the injection section to the mixing section.

According to a further aspect of the inventive bag the mixing chamber is at least partially and initially delimited against the inner bag volume by means of a weld seal connecting two opposed and adjacent side walls of the bag to each other. Such a weld seal can be easily realized during preproduction/pre-configuration of the inventive bag, in particular if the bag is formed from a flat tubular plastic film material.

According to a further aspect of the inventive bag the weld seal has a first portion and a second portion, wherein a seal strength of the second portion is lower than a seal strength of the first portion. By consequence, the mixing chamber is initially fully separate from the remainder of the inner bag volume such that the foam precursor substances are prevented from exiting the mixing chamber prior to being fully mixed with each other. However, the mixture is allowed to expand from the mixing chamber by breaking the second portion of the weld seal, whereby a fluid connection is created between the mixing chamber and the remainder of the inner bag volume.

According to a further aspect of the inventive bag the mixing chamber has, seen from the side, a conical, funnel shape, rectangular or rectangular with rounded bottom (pocket shape) shape. These shapes have been found to be particularly well suited to assist in thoroughly mixing the liquid foam precursor substances present within the mixing chamber.

According to a further aspect of the inventive bag the mixing chamber comprises mixing elements which preferably provide a labyrinth type path for a liquid mixture moving within the mixing chamber. These mixing elements further enhance the mixing effect.

According to a further aspect of the inventive bag at least some mixing elements are formed by point shape or line shape connecting portions of opposing but adjacent side walls of the bag at which the side walls are connected to each other, preferably by welding. Such mixing elements can be easily realized during production of the inventive bags, in particular if they are formed from a flat tubular plastic film material.

According to a further aspect of the inventive bag, in a sealed state of the bag, the open edge portion is closed by providing a weld seal such that the inner bag volume and the mixing chamber are sealed against an outside of the bag. Such a weld seal can easily be realized and provides for a reliable seal of the inner volume, such that the expanding mixture is prevented from exiting the inner volume of the bag.

According to a further aspect of the inventive machine the mixing device comprises at least one mixing roller having an outer peripheral surface area which comprises at least one protrusion, preferable a screw thread, wherein a contact region of the outer peripheral surface area of the roller with the outer surface of the bag is essentially parallel to a plane of the bag in its flat initial condition. This type of mixing device is easily to manufacture and to integrate into existing types of machines. Furthermore, it comprises a good mixing action and may be integrated into the normal "flow" of the bag material inside the machine. For example, during the mixing action the bag may be continuously fed through the machine such that a relatively high number of bags with foam may be produced within a certain amount of time.

According to a further aspect of the inventive machine the mixing device comprises at least on rotational stirrer having a rotational axis which is orthogonal to a plane of the bag. This type of mixing device provides for a particularly good mixing action.

The features and the advantages of the invention will be evident from the following description, regarding particular embodiments thereof, which is made as a non-limiting example with reference to the attached drawings, wherein:

FIG. 9 is a schematic side view of a second embodiment of a web type bag material for producing a foam-in-bag dunnage material;

FIG. 10-14 are schematic side views of the web type bag material of FIG. 9 and of essential parts of a second embodiment of a machine for producing a foam-in-bag dunnage material during production of a foam-in-bag dunnage material;

In the following detailed description, equivalent elements and regions of different embodiments are designated with identical reference signs.

Figure 1:
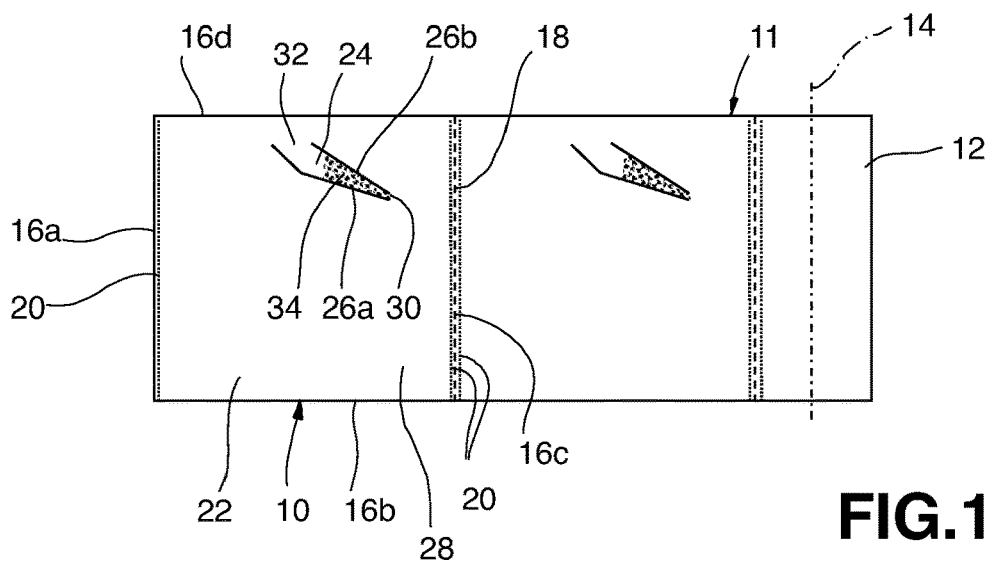
FIG. 1 is a schematic side view of a first embodiment of a web type bag material for producing a foam-in-bag dunnage material.

A bag for producing a foam-in-bag dunnage material is generally designated with reference numeral 10. It is part of a web type film material 11 rolled to a cylindrical supply roll 12 having a rotational axis 14. In FIG. 1, the bag 10 is shown in an initial condition just after being unrolled from supply roll 12. In this initial condition, the bag 10 has a rectangular flat and thin shape with four straight edges 16a-d and is formed by two parallel, adjacent, and flat side walls (without reference numeral). A perforation 18 is provided between adjacent bags 10 such that a "finished" bag 10 can easily be separated from the remainder of the web type film material 11.

The bottom edge 16b and the two side edges 16a and 16c form a closed and sealed edge portion, whereas top edge 16d in the non sealed state of the bag 10 of FIG. 1 forms an initially open and unsealed edge portion. The bottom edge 16b is formed by folding upon itself a thin plastic film material. The two side edges 16a and 16c are closed by weld lines 20 which connect and seal the two parallel, adjacent and flat side walls which are arranged in a parallel and adjacent relationship by the above mentioned folding step when the web type supply material 11 is preconfigured prior to being rolled into the cylindrical supply roll 12.

The two parallel side walls and the edge portions 16a-d delimit an inner bag volume 22. As can be seen from FIG. 1, the bag 10 comprises a bag structure comprising a mixing chamber 24. The mixing chamber 24 is adapted to mix foam precursor substances as will be shown in more detail further below. As can be seen from FIG. 1, the mixing chamber 24 is arranged within the inner bag volume 22. It comprises two lateral side limits 26a and 26b which are formed by weld seal lines. These weld seal lines 26a and 26b connect the two opposing and adjacent side walls of the bag 10 to each other and are provided also during preconfiguration of the web type supply material 11 prior to forming the cylindrical supply roll 12.

The weld seal lines 26a and 26b partially delimit and seal the mixing chamber 24 against a remainder 28 of the inner bag volume 22. "Partially" means that the mixing chamber 24 has a small orifice 30 formed between adjacent ends of the weld seal lines 26a and 26b which orifice 30 opens into the remainder 28 of the inner bag volume 22. Furthermore, in the non-sealed state of the bag 10 shown in FIG. 1, the mixing chamber 24 is fluidly connected to the open edge portion 16d of the bag 10 by an opening 32 formed between adjacent ends of the weld seal lines 26, these ends being opposite to the ends forming the orifice 30.

As can be seen from FIG. 1, seen from the side the mixing chamber 24 generally has a funnel shape, the small dimension of the funnel being at the orifice 30 opening into the remainder 28 of the inner bag volume 22. However, other shapes are possible, such as a conical shape, a rectangular shape, or a rectangular shape with a rounded bottom (pocket shape), as will be seen further below.

As also can be seen from FIG. 1, the mixing chamber 24 may comprise mixing elements 34 which are drawn in FIG. 1 as a plurality of black points. In the embodiment of FIG. 1, by way of example the mixing elements 34 are formed by point shape connecting portions of the side walls of the bag 10 at which the side walls are connected to each other, for example by welding. As will be seen hereinbelow, the mixing elements 34 form an obstacle for the liquid chemical foam precursor substances contained within the mixing chamber 24 in order to further enhance the mixing efficiency. Preferably, the mixing elements 34 are arranged within the mixing chamber 24 such that they provide a labyrinth type path for a fluid mixture and/or the liquid foam precursor substances moving within the mixing chamber 24 during the mixing action, as will be described further below.

Figure 2:
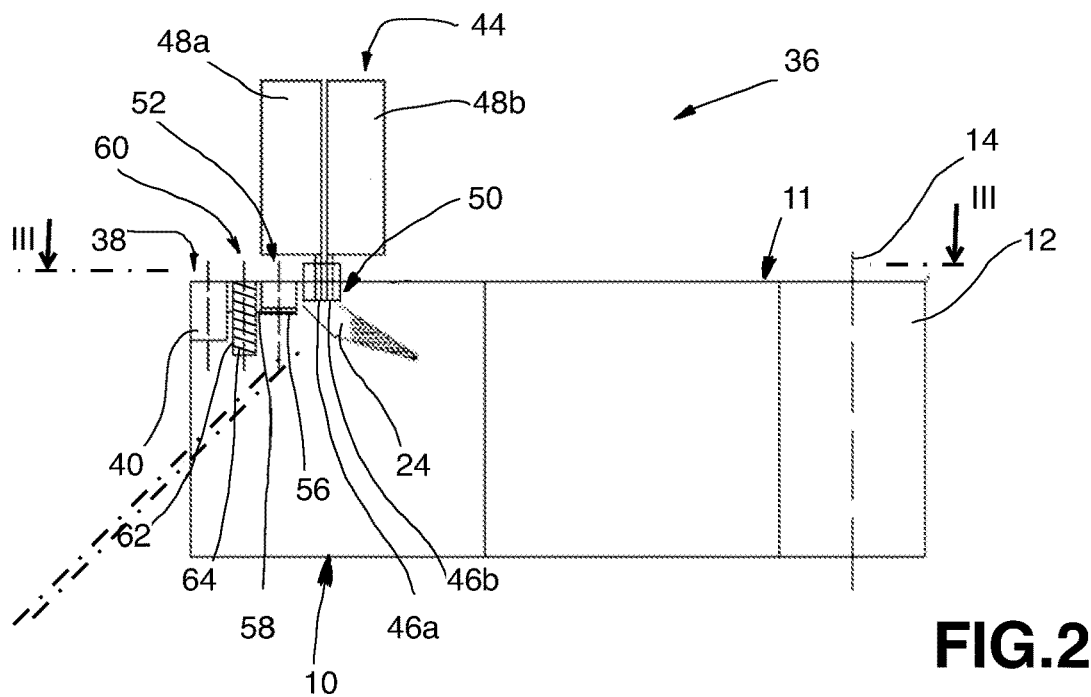
FIG. 2 is a schematic side view of the web type bag material of FIG. 1 and of essential parts of a first embodiment of a machine for producing a foam-in-bag dunnage material.
Figure 3:
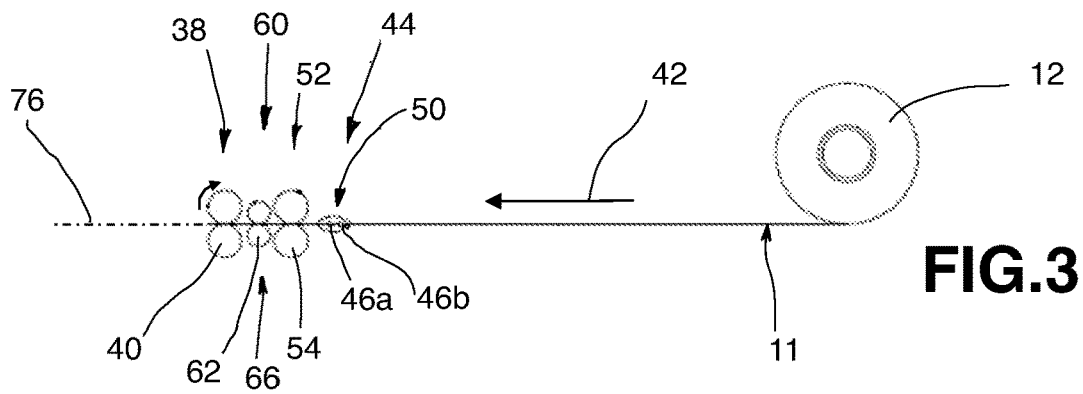
FIG. 3 is a sectional view along the lines III-III of FIG. 2.

Now, reference is made to FIGS. 2 and 3, which additionally show essential parts of a machine 36 for producing a foam-in-bag dunnage material using a bag 10 as described above in connection with FIG. 1. The machine 36 comprises a feed device 38 in the form of a pair of driven rotating traction rollers 40. As can be seen from FIG. 3 the web type film material 11 is clamped between the driven rotating traction rollers 40 such that it is pulled from the cylindrical supply roll 12 in the direction of arrow 42.

Furthermore, the machine 36 comprises an injection device 44 comprising two injection nozzles 46a and 46b and a first foam precursor supply 48a for a liquid chemical foam precursor substance A and a second foam precursor supply 48b for a liquid chemical foam precursor substance B. In a preferred embodiment, the foam precursor supplies 48a and 48b may comprise plastic cylindrical cartridges containing the liquid chemical foam precursor substances A and B. The cartridges may act like a syringe and therefore each may comprise a motorized pusher in order to dispense the liquid chemical foam precursor substance A and B, respectively. The cartridges may be unitary with injection nozzles 46a and 46b such that the whole group may be disposed when a cartridge is empty. Alternatively, each foam precursor supply 48a-b may comprise a delivery pump (non-shown) and a foam precursor tank (non-shown). The injection nozzles 46a and 46b may be in a fixed and stationary position. Alternatively, they may be movable from an upper retracted position where they are outside of the travel path of the web type film material 11 to a lower extended position which is shown in FIG. 2 where they are arranged in an injection section 50 of the machine 36.

Downstream of the injection device 44 is arranged a sealing device 52 presently in the form of a pair of sealing rollers 54 comprising a circumferential heated welding portion 56. As can be seen from FIG. 3 the web type film material 11 is clamped between the sealing rollers 54 such that, when the web type film material 11 is pulled through the sealing device 52 by means of feed device 38, a weld seal 58 is formed which closes the initially open edge portion 16d such that the inner bag volume 22 as well as the mixing chamber 24 are sealed against an outside of the bag 10.

Downstream of the sealing device 52, that is between the sealing device 52 and the feed device 38, a mixing device 60 is arranged which comprises a pair of mixing rollers 62 each having an outer surface area (without reference sign). In the present exemplary embodiment this outer surface area may comprise a protrusion, which in the present exemplary embodiment may be in the form of a screw thread 64. Alternatively, a cylindrical mixing roller may be used having a flat outer surface area without any protrusion. The main task of these cylindrical mixing rollers 62 is to push the liquid chemical foam precursor substances A and B through the labyrinth formed by the mixing elements 34 in the funnel-shape mixing chamber 24, which provides a mixing action, like in a static mixer. As can be seen from FIG. 3 a contact region of the outer surface area of the mixing rollers 62 with the outer surfaces of the bag 10 is essentially parallel to a plane 76 of the bag 10 and the web type film material 11, respectively.

The mixing device 60 is arranged in a mixing section 66 of the machine 10, which is downstream from the injection section 50, when seen in the feed direction 42. As can be seen from FIG. 3 the web type film material 11 is clamped between the mixing rollers 62 such that, when the web type film material 11 is pulled through the mixing device 60, a mixing action is exerted onto any foam precursor substance present within the mixing chamber 24 of the bag 10.

Now, operation of the machine 36 and a method for producing foam-in-bag dunnage material using a bag 10 is explained with respect specifically to FIGS. 4-8. However, it is to be noted that for the sake of clarity not all reference signs are drawn in FIGS. 4-8.

Figure 4:
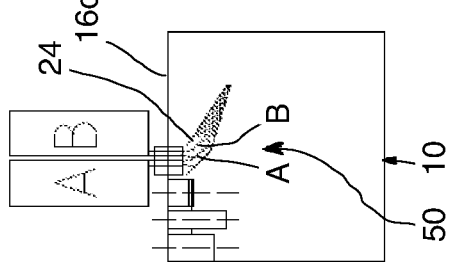

Initially, as can be seen from FIG. 4, a bag 10 having a mixing chamber 24 and close and open edge portions 16a-d is provided in a non-sealed state where the upper edge 16*d* is open. In FIG. 4, the bag 10 has been moved by means of the feed device 38 such that the mixing chamber 24 with its opening 32 connected to open edge portion 16*d* is in the injection section 50 of the machine 36. When the mixing chamber 24 is in the injection section 50, movement of the web type film material 11 by the feed device 38 is stopped, such that the bag 10 becomes stationary for the short period of time. It is to be noted that, until the web type film material 11 is stopped as shown in FIG. 4, the sealing device 52 already has started to create the weld seal 58.

Figure 5:
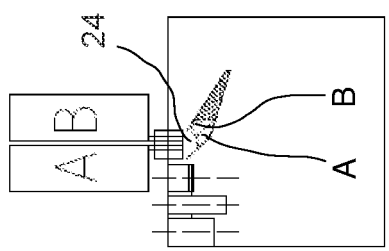

Then, the injection nozzles 46*a-b* are lowered into the opening 32 of the mixing chamber 24, and each nozzle 46*a* and 46*b* delivers a respective liquid chemical foam precursor substance A and B through the opening 32, which insofar is a connection of the mixing chamber 24 to the open edge 16*d*, into the mixing chamber 24, namely in that part of the mixing chamber 24 which is adjacent to the opening 32 and which is free from mixing elements 34. The situation after the injection of the foam precursor substances A and B is shown in FIG. 5.

Figure 6:
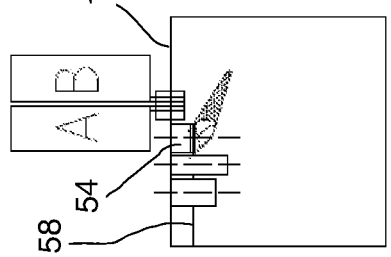

Thereafter, the feed device 38 is activated again, such that the web type film material 11 is pulled in the direction of arrow 42 in FIG. 3. By consequence, the sealing device 52 with its sealing rollers 54 continues to build the weld seal 58 which now extends over the opening 32 of the mixing chamber 24, as is shown in FIG. 6. By consequence, the mixing chamber 24 now is fully closed against an outside of the bag 10 by means of the weld seal 58, the only remaining opening of the mixing chamber 24 being the orifice 30 opening into the remainder 28 of the inner bag volume 22.

In the course of the movement of the web type film material 11 and the bag 10 through the machine 36, the mixing chamber 24 is moved from the injection section 50 of the machine 36 in which the injection nozzles 46*a-b* can be arranged to the mixing section 66 of the machine 36 where the mixing rollers 62 of the mixing device 60 are arranged. In the course of the further movement of the web type film material 11 and of the mixing chamber 24 through the mixing device 60 and, more specifically, through the gap between the two mixing rollers 62, the foam precursor substances A and B are squeezed towards the orifice 30 of the mixing chamber 24 such that the foam precursor substances A and B are urged onto a labyrinth type path between the mixing elements 34.

Figure 7:
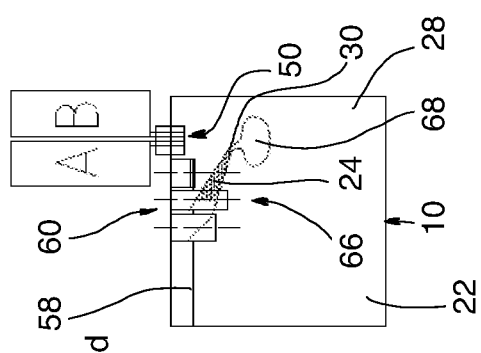

Or, in other words: the mixing device 60 provides a mixing action onto the exterior surface of the bag 10 and by consequence to the foam precursor substances A and B enclosed within the mixing chamber 24 such that a mixture 68 of the film precursor substances A and B is created which is discharged from the mixing chamber 24 into the remainder 28 of the inner bag volume 22, as is shown in FIG. 7.

Figure 8:
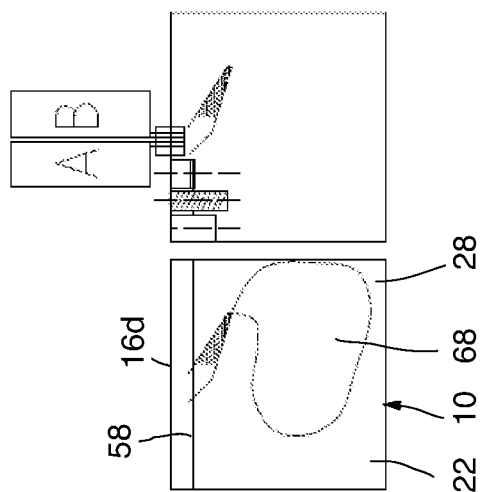
FIGS. 4-8 are schematic side views similar to the one of FIG. 2 during the production of a foam-in-bag dunnage material.

In the further course of the movement of the web type film material 11 and of the mixing chamber 24 through the mixing device 60, the mixture 68 of the foam precursor substances A and B is fully squeezed out of the mixing chamber 24 through orifice 30 into the remainder 28 of the inner bag volume 22 of the bag 10, as is shown in FIG. 8. Also, in this further course of the movement of the web type film material 11 the initially open edge 16*d* is fully closed by means of the weld seal 58, which transforms the bag 10 from its initially non-sealed state into a fully sealed state in which the open edge portion 16*d* is closed such that the entire inner bag volume 22 and the mixing chamber 24 are sealed against an outside of the bag 10.

As can be seen from a comparison of FIGS. 7 and 8, the mixture 68 provides for chemical reaction between the film precursor substances A and B wherein gas bubbles are created making the volume of the mixture 68 to expand. As also can be seen from FIG. 8, the bag 10 now can be separated by means of the perforation 18 from a remainder of the web type film material 11.

The separated bag 10 with the expanding and still liquid mixture 68 now can be inserted, for example, into a shipping container (not shown) having one or more articles therein. The expanding mixture 68 will more or less fill out the void volume existing initially between the articles and the inner walls of the container and then harden, whereby the hardened expanded mixture 68 creates a rather low density foam dunnage material which is separated from the outside by means of the plastic material of the bag 10 which thereby functions as an enclosure for the hardened expanded mixture 68.

An alternative embodiment of a bag 10 and a web type film material 11 is shown in FIG. 9. The bag 10 of FIG. 9 distinguishes over the bag 10 of FIGS. 1-8 in the shape and implementation of the mixing chamber 24.

As can be seen from FIG. 9, the mixing chamber 24 of the bag 10 has a rectangular shape with a rounded bottom, like a pocket in a trouser. Furthermore, the mixing chamber 24 is initially delimited against the remainder 28 of the inner bag volume 22 by means of a weld seal line 26 having a first portion 70*a* and a second portion 70*b*. The first portion 70*a* delimits the upper part of the mixing chamber 24, whereas the second portion 70*b* delimits the lower rounded part of the mixing chamber 24. The second portion 70*b* has a seal strength which is lower than a seal strength of the first portion 70*a*.

When the web type film material 11 of FIG. 9 is used for producing a foam-in-bag dunnage material in the same machine 36 of FIGS. 2-8, as is shown in FIGS. 10-14, during the action of the mixing device 60 and the mixing rollers 62 onto the film precursor substances A and B enclosed within mixing chamber 24, the mixture 68 is created without this mixture 68 being able to discharge into the remainder 28 of the inner bag volume 22. By consequence, at the end of the mixing step, as is shown in FIG. 13, the mixture 68 is still within the mixing chamber 24 which is entirely closed to the outside by the weld seal 58 and which still remains entirely closed to the remainder 28 of the inner bag volume 22 by the weld seal lines 26.

However, as the chemical reaction of the mixture 68 makes the mixture 68 to expand, the expanding mixture 68 breaks the first portion 70*a* of the weld seal 26 such that the expanding mixture 68 may discharge into the remainder 28 of the inner bag volume 22, as is shown in FIG. 14.

Figure 15:
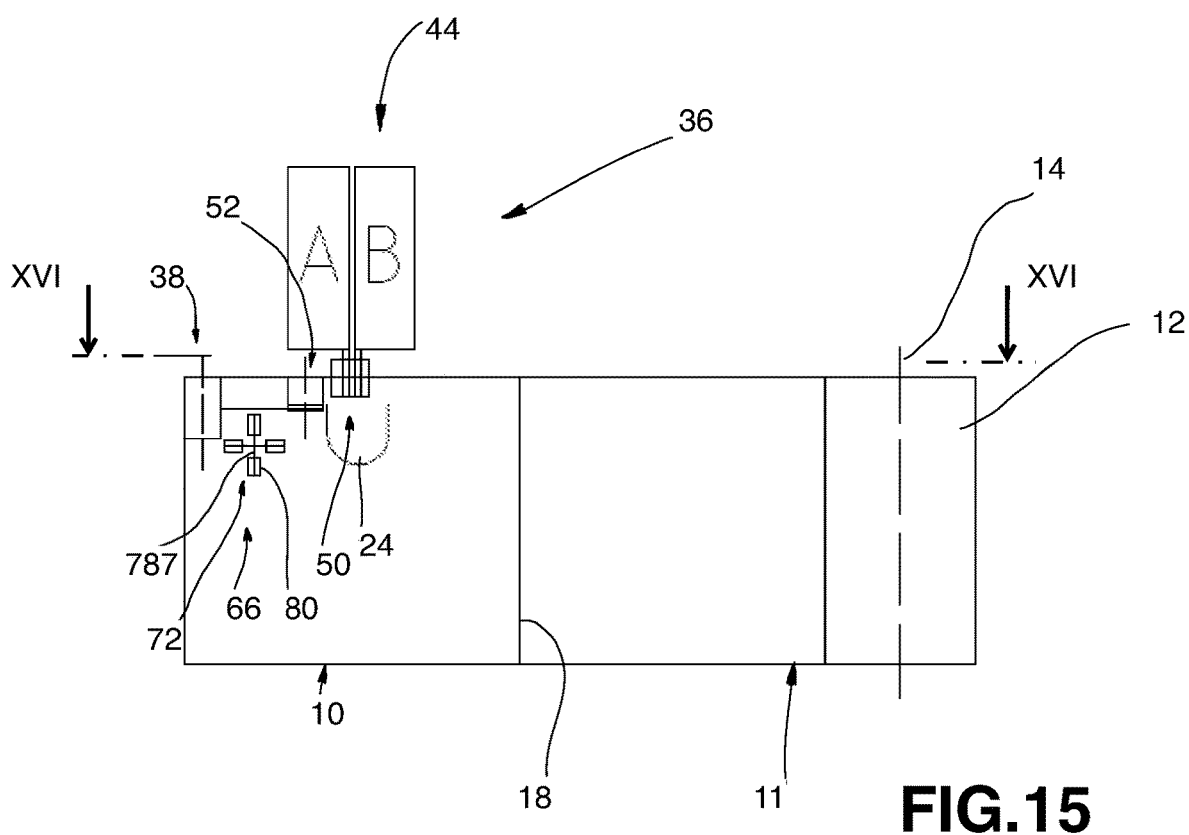
FIG. 15 is a schematic side view of the second embodiment of a web type bag material and essential parts of a third embodiment of a machine for producing a foam-in-bag dunnage material.
Figure 16:
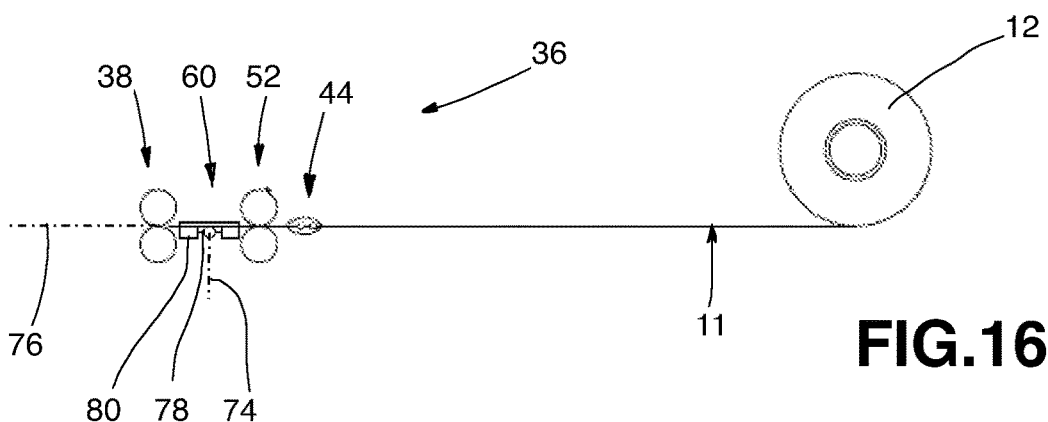
FIG. 16 is a sectional view along the lines XVI-XVI of FIG. 15.

The web type film material 11 of FIGS. 9-14 is shown in FIGS. 15-16 together with an alternative embodiment of a machine 36. The machine 36 of the FIGS. 15-16 distinguishes over the machine 36 shown in FIGS. 2-14 by the implementation of the mixing device 60. As can be seen specifically from FIG. 15, the mixing device 60 of FIGS. 15-16 comprises a rotational stirrer 72 having a rotational axis 74 (FIG. 16) which is orthogonal to a plane 76 of the bag 10 and the web type film material 11, respectively, in the initial flat configuration, as shown in FIG. 16. The rotational stirrer 72 preferably has a plurality of arms 78 with rollers 80 at the end.

Figure 17:
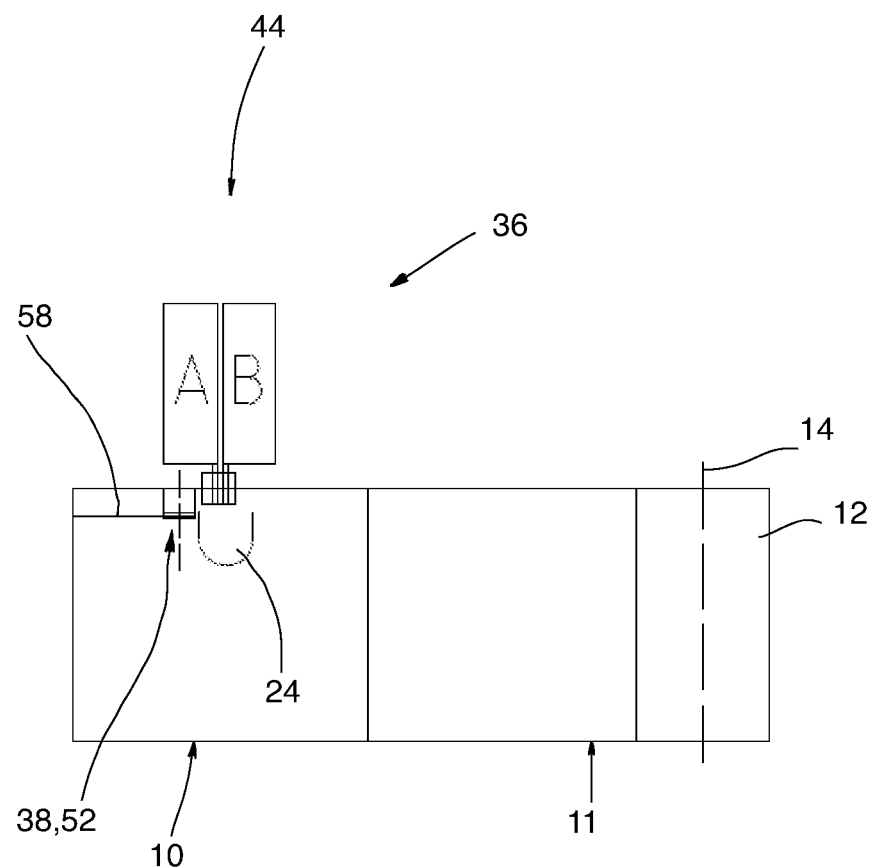
FIG. 17 is a schematic side view of the second embodiment of a web type bag material and essential parts of a fourth embodiment of a machine for producing a foam-in-bag dunnage material.

A further alternative machine 36 is shown in FIG. 17, again together first with the web type film material of FIGS. 9-16. As can be seen from FIG. 17, this machine 36 does not comprise a mixing device and does not comprise a separate feed device. Instead, the sealing device 52 provides also the transport of the web type film material 11. The mixing action of the foam precursor substances A and B inside the mixing chamber 24 in this case must be provided manually, for example by means of the hands of a person.

While in all above embodiments all connections of the two walls of the bag 10 are realized by welding, it is to be understood that also other connection methods are possible, such as for example gluing.

The invention claimed is:

1. Bag for producing a foam-in-bag dunnage material, comprising, in a non-sealed state of the bag, three straight closed side edges and, in the non-sealed state of the bag, one straight and completely open side edge, the closed and open side edges delimiting an inner bag volume, wherein a bag structure of the bag, in the non-sealed state of the bag, comprises a mixing chamber which is adapted to receive foam precursor substances, which is arranged within the inner bag volume, which is at least partially and initially delimited against the remainder of the inner bag volume, the remainder of the inner bag volume, in the non-sealed state of the bag, being formed by one cohesive chamber, wherein the mixing chamber is at least partially and initially delimited against the remainder of the inner bag volume by means of a weld seal connecting two side walls of the bag to each other, the mixing chamber as well as the remainder in the non-sealed state of the bag both being open by both being connected to the one open side edge to allow to introduce the liquid chemical foam precursor substances through the open edge portion into the mixing chamber, wherein in said non-sealed state of the bag, the bag does not comprise any portion of the inner bag volume other than the mixing chamber and the remainder of the inner bag volume.

2. The bag according to claim 1 wherein the weld seal has a first portion and a second portion, wherein a seal strength of the second portion is lower than a seal strength of the first portion, such that the mixing chamber is initially fully separate from the remainder of the inner bag volume, and such that by breaking the second portion of the weld seal, a fluid connection is created between the mixing chamber and the remainder of the inner bag volume.

3. The bag according to claim 1 wherein the mixing chamber has, seen from the side, a conical shape or a funnel shape.

4. The bag according to claim 1 wherein the mixing chamber comprises mixing elements which provide a labyrinth type path for a fluid mixture moving within the mixing chamber.

5. The bag according to claim 4 wherein at least some mixing elements are formed by point shape connecting portions of the side walls of the bag at which the side walls are connected to each other, by welding.

6. The bag according to claim 1 wherein, in a sealed state of the bag, the open edge portion is closed by providing a weld seal such that the inner bag volume and the mixing chamber are sealed against an outside of the bag.

7. Method for producing foam-in-bag dunnage material, comprising the following steps:
   a. providing a bag according to claim 1 in a non-sealed state;
   b. providing at least two foam precursor substances into a mixing chamber of the bag through a connection of the mixing chamber to the open edge portion;
   c. transforming the bag from its non-sealed state into its sealed state wherein the open edge portion is closed such that the inner bag volume and the mixing chamber are sealed against an outside of the bag;
   d. providing a mixing action to the foam precursor substances enclosed within the mixing chamber in order to create a mixture of the foam precursor substances; and
   e. allowing the mixture to discharge from the mixing chamber into a remainder of an inner bag volume of the bag.

8. Method according to claim 7 wherein in step c the transformation is carried out by providing a weld seal along the open edge portion.

9. Method according to claim 8 wherein in step e the mixture is allowed to discharge from the mixing chamber through an outlet into the remainder of the inner bag volume.

10. Method according to claim 7 wherein in step e the mixture is allowed to expand from the mixing chamber by breaking a second portion of a weld seal delimiting the mixing chamber against the inner bag volume wherein a seal strength of the second portion is lower than a seal strength of an adjacent first portion of the weld seal.

* * * * *